United States Patent
Fu et al.

(10) Patent No.: US 7,523,342 B1
(45) Date of Patent: Apr. 21, 2009

(54) DATA AND CONTROL INTEGRITY FOR TRANSACTIONS IN A COMPUTER SYSTEM

(75) Inventors: Peter L. Fu, Sunnyvale, CA (US); Thomas M. Wicki, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 546 days.

(21) Appl. No.: 11/262,254

(22) Filed: Oct. 28, 2005

(51) Int. Cl.
  G06F 11/08 (2006.01)
  G06F 11/10 (2006.01)
(52) U.S. Cl. .......................................... 714/4; 714/805
(58) Field of Classification Search ............ 714/4, 714/805
  See application file for complete search history.

(56) References Cited

U.S. PATENT DOCUMENTS

| | | | |
|---|---|---|---|
| 4,254,464 A * | 3/1981 | Byrne | 710/100 |
| 4,359,772 A | 11/1982 | Patel | |
| 5,161,156 A * | 11/1992 | Baum et al. | 714/4 |
| 5,467,359 A * | 11/1995 | Huon et al. | 714/755 |
| 5,502,733 A * | 3/1996 | Kishi et al. | 714/748 |
| 5,581,729 A * | 12/1996 | Nishtala et al. | 711/143 |
| 5,583,786 A | 12/1996 | Needham | |
| 5,588,122 A * | 12/1996 | Garcia | 710/52 |
| 5,703,886 A * | 12/1997 | Lee et al. | 714/781 |
| 5,805,614 A * | 9/1998 | Norris | 714/776 |
| 6,256,753 B1 | 7/2001 | Williams | |
| 6,304,992 B1 | 10/2001 | Cypher | |
| 6,341,132 B1 * | 1/2002 | Benayoun et al. | 370/397 |
| 6,469,854 B1 | 10/2002 | Gill et al. | |
| 6,516,442 B1 * | 2/2003 | Wang et al. | 714/776 |
| 6,560,725 B1 | 5/2003 | Longwell et al. | |
| 6,701,469 B1 | 3/2004 | Matter et al. | |
| 6,745,359 B2 | 6/2004 | Nadeau-Dostie | |
| 6,751,321 B1 | 6/2004 | Kato et al. | |

(Continued)

FOREIGN PATENT DOCUMENTS

WO  WO 01/25924 A1  4/2001

OTHER PUBLICATIONS

Anshuman Chandra, "System-on-a-Chip Test-Data Compression and Decompression Architectures Based on Golomb Codes," IEEE, 2001, pp. 355-368.

*Primary Examiner*—Stephen M Baker
(74) *Attorney, Agent, or Firm*—Meyertons Hood Kivlin Kowert & Goetzel, P.C.; Rory D. Rankin

(57) ABSTRACT

A computer system configured to enhance data protection. A computer system includes one or more clients, such as processing subsystems and a memory subsystem interconnected via a network. Transactions within the system may involve the separation of data and a corresponding address in both space and time. At various points in the system, operations may be performed which seek to reunite a data and corresponding address, such as a store operation. In order to further ensure the correspondence of data and an address which is to be used in an operation, clients are configured to generate and utilize an additional symbol. The symbol is generated at least in part on an address which corresponds to data. The symbol is then associated with the data and serves to represent the corresponding address. The symbol may then be utilized by various clients within the system to check an address which is proposed to be used in an operation with the data.

20 Claims, 9 Drawing Sheets

U.S. PATENT DOCUMENTS

| | | |
|---|---|---|
| 6,886,121 B2 | 4/2005 | Dervisoglu et al. |
| 6,901,546 B2 | 5/2005 | Chu et al. |
| 6,941,493 B2 | 9/2005 | Phelps |
| 6,973,613 B2 | 12/2005 | Cypher |
| 6,976,194 B2 | 12/2005 | Cypher |
| 6,996,766 B2 | 2/2006 | Cypher |
| 7,222,270 B2 * | 5/2007 | Meaney et al. ............ 714/48 |
| 2004/0133831 A1 | 7/2004 | Williams et al. |
| 2004/0133832 A1 | 7/2004 | Williams et al. |

* cited by examiner

| ADDRESS 602 | CLIENT 1 604 | CLIENT 2 606 | CLIENT 3 608 | CLIENT 4 610 | CLIENT 5 612 |
|---|---|---|---|---|---|
| Aa | — | — | M | — | — |
| Ab | — | — | M | — | — |
| Ac | — | — | M | — | — |
| Ad | M | — | — | — | — |
| Ae | S | — | S | S | — |
| Af | — | — | M | — | — |
| Ag | — | — | — | M | — |
| ... | ... | ... | ... | ... | ... |

FIG. 3

| Packet Type | Full Name | Description |
|---|---|---|
| RTS | ReadToShare | Requests read-only copy of coherency unit |
| RTO | ReadToOwn | Requests writable copy of coherency unit |
| RS | ReadStream | Request read-once copy of coherency unit |
| WS | WriteStream | Request to write entire coherency unit and send to memory |
| CPI | Copyback Invalidate | Retrieve data from remote processor and invalidate in remote processor. |
| INV | Invalidate | Invalidate coherency unit in remote processor. |
| PULL | Pull | Pull Data. |
| ACK | Acknowledge | Acknowledgement |
| ACKN | Acknowledge - No Data | Acknowledge Request, No data provided. |
| DATA | Data | Packet which conveys data. |

FIG. 4 ion errors or storage errors. For example, error codes may be used to detect and correct errors in data transmitted via any transmission medium (e.g. conductors and/or transmitting devices between chips in an electronic system, a network connect, a telephone line, a radio transmitter, etc.). Error codes may additionally be used to detect and correct errors associated with data stored in the memory of computer systems. One common use of error codes is to detect and correct errors of data transmitted on a data bus of a computer system. In such systems, error correction bits, or check bits, may be generated for the data prior to its transfer or storage. When the data is received or retrieved, the check bits may be used to detect and correct errors within the data.

DATA AND CONTROL INTEGRITY FOR TRANSACTIONS IN A COMPUTER SYSTEM

BACKGROUND OF THE INVENTION

1. Field of the Invention

This invention is related to error detection and correction in computing systems.

2. Description of the Related Art

Error codes are commonly used in electronic and computing systems to detect and correct data errors, such as transmission errors or storage errors. For example, error codes may be used to detect and correct errors in data transmitted via any transmission medium (e.g. conductors and/or transmitting devices between chips in an electronic system, a network connect, a telephone line, a radio transmitter, etc.). Error codes may additionally be used to detect and correct errors associated with data stored in the memory of computer systems. One common use of error codes is to detect and correct errors of data transmitted on a data bus of a computer system. In such systems, error correction bits, or check bits, may be generated for the data prior to its transfer or storage. When the data is received or retrieved, the check bits may be used to detect and correct errors within the data.

Another source of errors in electrical systems may be so-called "soft" or "transient errors". Transient memory errors may be caused by the occurrence of an event, rather than a defect in the memory circuitry itself. Transient memory errors may occur due to, for example, random alpha particles striking the memory circuit. Transient communication errors may occur due to noise on the data paths, inaccurate sampling of the data due to clock drift, etc. On the other hand, "hard" or "persistent" errors may occur due to component failure.

Generally, various error detection code (EDC) and error correction code (ECC) schemes are used to detect and correct memory and/or communication errors. For example, parity protection may be used. With parity, a single parity bit is stored/transmitted for a given set of data bits, representing whether the number of binary ones in the data bits is even or odd. The parity is generated when the set of data bits is stored/transmitted and is checked when the set of data bits is accessed/received. If the parity doesn't match the accessed set of data bits, then an error is detected. Such an approach may, for example, be good for single bit error detection.

Other EDC/ECC schemes assign multiple check bits per set of data bits. The encodings are selected such that a bit error or errors may be detected, and in some cases the encodings may be selected such that the bit or bits in error may be identifiable so that the error can be corrected (depending on the number of bits in error and the ECC scheme being used). Typically, as the number of bit errors that can be detected and/or corrected increases, the number of check bits used in the scheme increases as well.

In addition to the above, there are failure modes where the entire EDC or ECC codeword is misplaced or substituted. In such a case, the error protection codes may not provide protection. Examples of such failures include addressing failures in a memory array, logic failures in control state machines, or various kinds of control failures at structures such as registers, multiplexors, queues or stacks. Under these circumstances, perfectly valid data intended for different transactions can become mixed or swapped, resulting in undetectable errors and silent data corruption.

As efforts have been made to optimize and enhance the memory systems of computing devices, new complexities such as cache hierarchies, coherency protocols, other features have been introduced. Further, memory transactions other than basic reads and writes are now common. In many cases, a unit of memory data may be viewed as a data value, along with its associated state, bound to an address within a well defined address space.

In some systems, optimization of memory system transactions has led to the separation of these components of transaction data and/or state from its associated address. For example, in a system where a piece of memory data may reside in one of several caches, a transaction to update the data value may take the form of an address query through an address only path, followed by the data value (and/or state information) traveling on a different path at a different time in order to complete the transaction. In such an environment, individual error protection on the separate paths for the state, value, and address may not provide fault coverage for the entire transaction.

In view of the above, an effective method and mechanism for detecting errors is desired.

SUMMARY OF THE INVENTION

A method and mechanism for enhancing data protection in a computing system is contemplated.

In one embodiment, a computer system is configured to enhance data protection through a replication and compare method and mechanism. The computing system includes a plurality of client nodes or systems coupled via a network interconnect. A first client is configured to convey a request for data via the network. The request includes a corresponding address and a transaction ID which itself may be implicit in the address. A second client receives the request via the network and retrieves the requested data. The second client stores an association between the received address and the transaction and generates a symbol based at least in part on the address. In one embodiment, the second client maintains an association between the received address and the transaction by storing the address in a location of a local store. The location which is selected may correspond to selected bits of the address, such as index bits, which may also serve as an implicit transaction ID. The second client then conveys a response to the first client with the requested data to the processing subsystem, an identification of the transaction such as one or more bits of the address, and the generated symbol. The second client does not necessarily convey the entire address with the response. The first client receives the response and may use the included symbol to verify the correctness of an address that is to be used in association with the data. Upon a return of the data to the second client, such as through a writeback or copyback, the original transaction ID and a symbol based on the address are conveyed with the writeback data by the first client. The second client uses the transaction ID (e.g., index bits of the address) to retrieve the previously stored address, and uses the received symbol to verify the retrieved address.

Also contemplated is a computing system wherein a network interconnecting clients comprises separate address and data networks. The address network is configured to convey address transactions, and the data network is configured to convey data transactions. Requests conveyed via the address or data network may include an address corresponding to data, or data corresponding to an address, but not both. Accordingly, transactions may involve the separation of addresses and corresponding data in space and/or time. In one embodiment, a symbol generated in part from an address accompanies corresponding data when it is conveyed via the network. The symbol represents some information about the address. A client using the data in an operation involving an address which is purported to represent the data's corresponding address, may be verified against the symbol.

These and other embodiments are contemplated and will become apparent upon reference to the following description and associated drawings.

BRIEF DESCRIPTION OF THE DRAWINGS

Other objects and advantages of the invention will become apparent upon reading the following detailed description and upon reference to the accompanying drawings.

FIG. 3 is a diagram of a directory in a memory device.

FIG. 4 depicts various types of packets.

Figure 1:
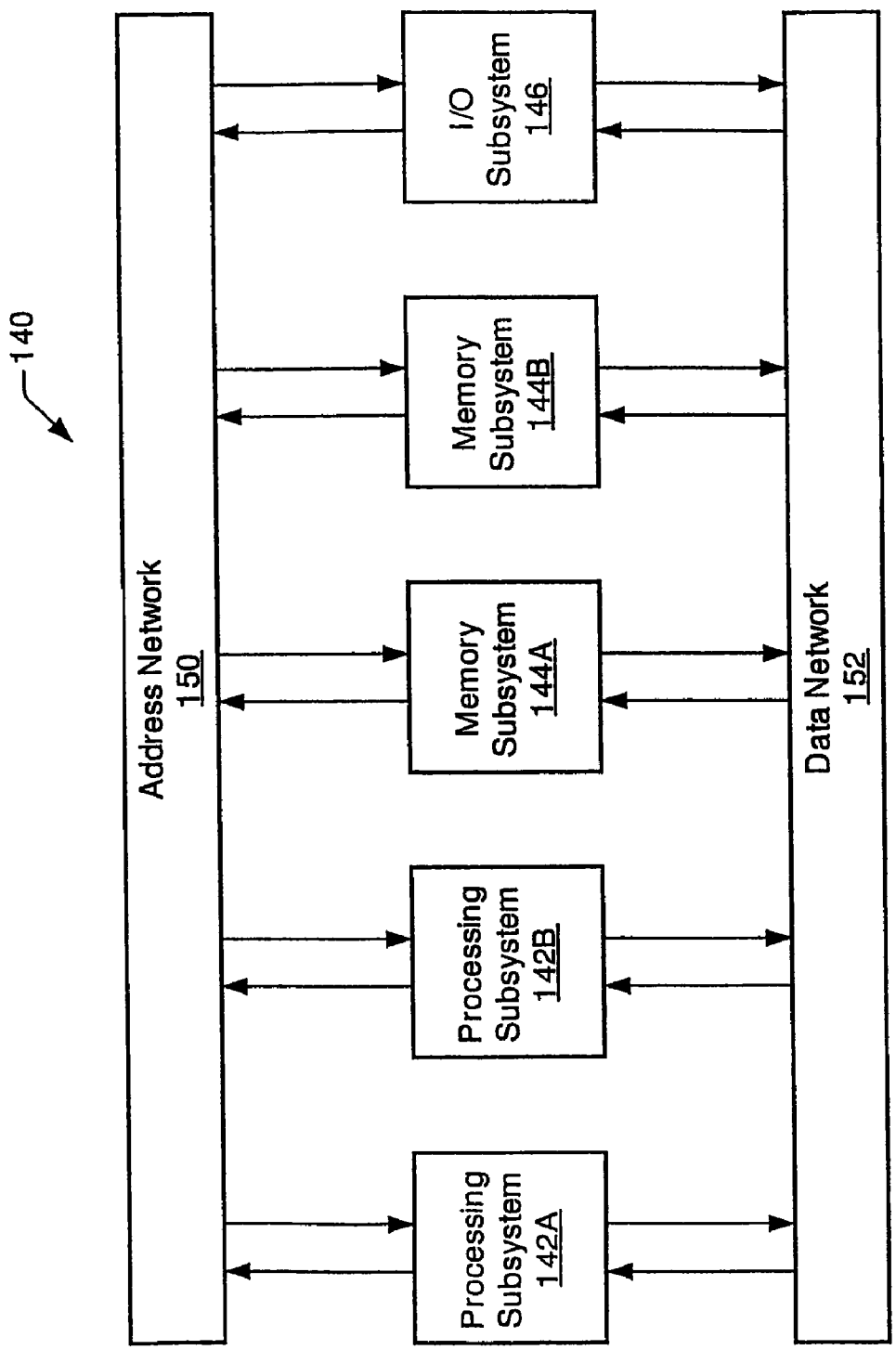
FIG. 1 is a block diagram of a multiprocessing node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Node Overview

FIG. 1 is a block diagram of one embodiment of a computer system 140. Computer system 140 includes processing subsystems 142A and 142B, memory subsystems 144A and 144B, and an I/O subsystem 146 interconnected through an address network 150 and a data network 152. Computer system 140 may be referred to as a "node". As used herein, the term "node" refers to a group of clients which share common address and data networks. In the embodiment of FIG. 1, each of processing subsystems 142, memory subsystems 144, and I/O subsystem 146 may be considered a client. It is noted that, although five clients are shown in FIG. 1, embodiments of computer system 140 employing any number of clients are contemplated. Elements referred to herein with a particular reference number followed by a letter will be collectively referred to by the reference number alone. For example, processing subsystems 142A-142B will be collectively referred to as processing subsystems 142.

Generally speaking, each of processing subsystems 142 and I/O subsystem 146 may access memory subsystems 144. Each client in FIG. 1 may be configured to convey address transactions on address network 150 and data on data network 152 using split-transaction packets. Typically, processing subsystems 142 include one or more instruction and data caches which may be configured in any of a variety of specific cache arrangements. For example, set-associative or direct-mapped configurations may be employed by the caches within processing subsystems 142. Because each of processing subsystems 142 within node 140 may access data in memory subsystems 144, potentially caching the data, coherency must be maintained between processing subsystems 142 and memory subsystems 144, as will be discussed further below.

Memory subsystems 144 are configured to store data and instruction code for use by processing subsystems 142 and I/O subsystem 146. Memory subsystems 144 preferably comprise dynamic random access memory (DRAM), although other types of memory may be used. Each address in the address space of node 140 may be assigned to a particular memory subsystem 144, referred to as the home subsystem of the address. Further, each memory subsystem 144 may include a directory suitable for implementing a directory-based coherency protocol. In one embodiment, each directory may be configured to track the states of memory locations assigned to that memory subsystem within node 140. For example, the directory of each memory subsystem 144 may include information indicating which client in node 140 currently owns a particular portion, or block, of memory and/or which clients may currently share a particular memory block. Additional details regarding suitable directory implementations will be discussed further below.

In the embodiment shown, data network 152 is a point-to-point network. However, it is noted that in alternative embodiments other networks may be used. In a point-to-point network, individual connections exist between each client within the node 140. A particular client communicates directly with a second client via a dedicated link. To communicate with a third client, the particular client utilizes a different link than the one used to communicate with the second client.

Address network 150 accommodates communication between processing subsystems 142, memory subsystems 144, and I/O subsystem 146. Operations upon address network 150 may generally be referred to as address transactions. When a source or destination of an address transaction is a storage location within a memory subsystem 144, the source or destination is specified via an address conveyed with the transaction upon address network 150. Subsequently, data corresponding to the transaction on the address network 150 may be conveyed upon data network 152. Typical address transactions correspond to read or write operations. A read operation causes transfer of data from a source outside of the initiator to a destination within the initiator. Conversely, a write operation causes transfer of data from a source within the initiator to a destination outside of the initiator. In the computer system shown in FIG. 1, a read or write operation may include one or more transactions upon address network 150 and data network 152.

Address network 150 may be configured to selectively transmit coherence requests corresponding to read or write memory operations using either a broadcast mode transmission or a point-to-point transmission mode. For coherence requests which are conveyed point-to-point by address network 150, a directory-based coherency protocol may be implemented. Conversely, when coherence requests are conveyed using a broadcast mode transmission, a snooping broadcast coherency protocol may be implemented.

Figure 2:
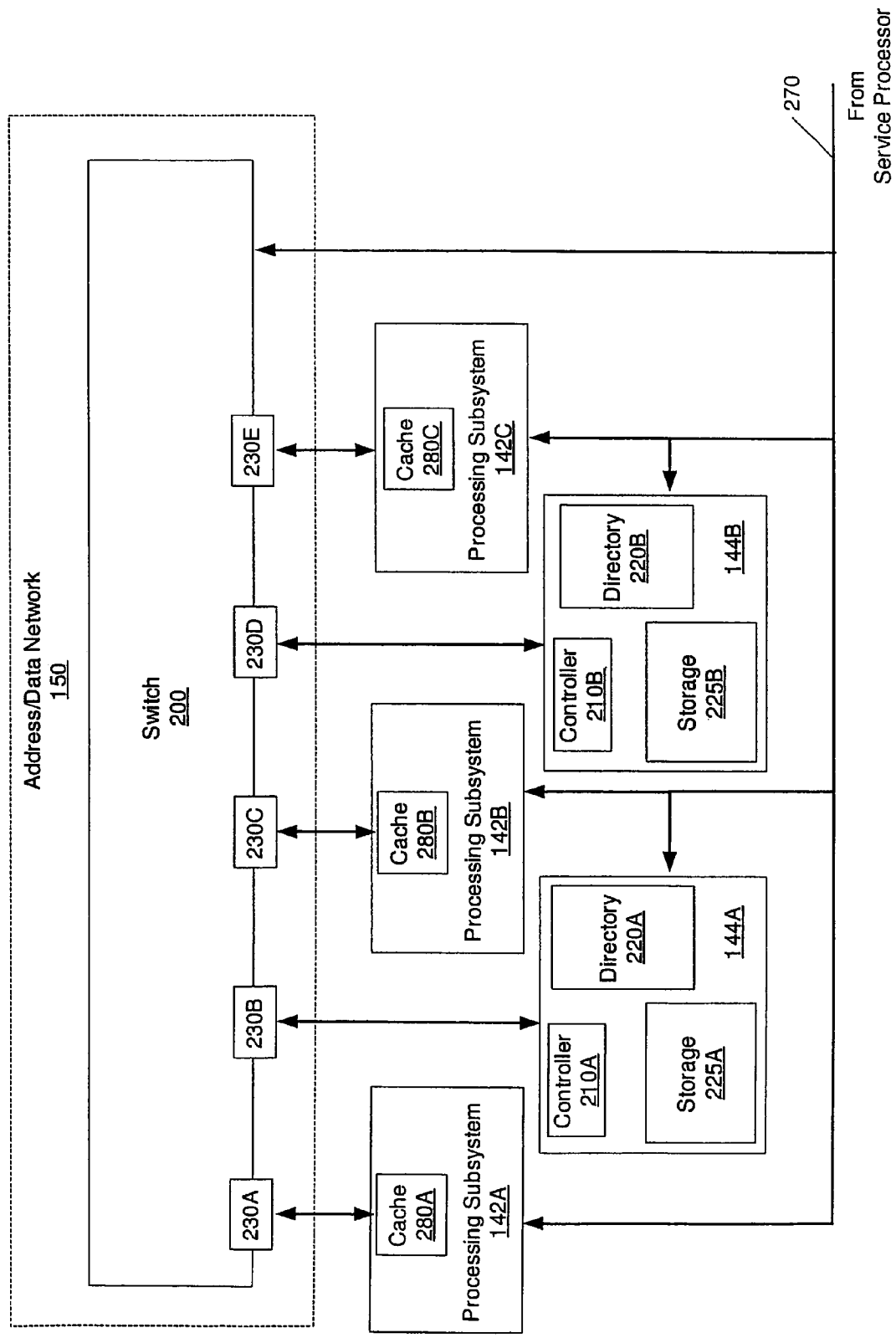
FIG. 2 is a diagram illustrating an address network and client devices.

FIG. 2 is a diagram illustrating a portion of one embodiment of computer system 140. FIG. 2 shows an address network 150, memory subsystems 144A-144B, and processing subsystems 142A-142C. In the embodiment shown, address network 150 includes a switch 200 including ports 230A-230E. Processing units 142A-142C each include a respective cache 280A-280C configured to store memory data. Memory subsystems 144A and 144B are coupled to switch 200 via ports 230B and 230D, respectively, and include controller circuitry 210A-210B, directory 220A-220B, and storage 225A-225B. In the embodiment shown, ports 230 may include bi-directional links or multiple unidirectional links. Storage 225 may include RAM or any other suitable storage device.

Also illustrated in FIG. 2 is a network 270 (e.g., a switched network or bus) coupled between a service processor (not shown), switch 200, subsystems 142, and subsystems 144. The service processor may utilize network 270 to configure and/or initialize switch 200, subsystems 142, and subsystems 144. The service processor may be external to computer system 140 or may be a client included within computer system 140.

As previously described, address network 150 is configured to facilitate communication between clients within computer system 140. In the embodiment of FIG. 2, processing subsystems 142 may perform reads or writes which cause transactions to be initiated on address network 150. For example, a processing unit within processing subsystem 142A may perform a read to a memory location A that misses in cache 280A. In response to detecting the cache miss, processing subsystem 142A may convey a read request for location A to switch 200 via port 230A. The read request initiates a read transaction. In this example, location A may correspond to a memory location within storage 225A of memory subsystem 144A. Switch 200 may be configured to identify subsystem 144A as a home subsystem of location A and may convey a corresponding request to memory subsystem 144A via port 230B.

As stated previously, for coherence requests that are conveyed point-to-point by switch 200, a directory based coherence protocol is implemented. In alternative embodiments, switch 200 may support a broadcast protocol in addition to a point-to-point protocol. As shown in FIG. 2, each memory subsystem 144 includes a directory 220 that is used to implement a directory protocol. In one embodiment, a MESI cache coherency protocol is utilized. However, other protocols, such as MOESI, ESI, or otherwise are contemplated as well. In the MESI protocol, the owned "O" state, which allows for dirty shared copies, is not utilized. FIG. 3 illustrates one example of a directory 220A that may be maintained by a controller 210A within a memory subsystem 144A. In this embodiment, directory 220A includes an entry 620 for one or more memory blocks within storage 225A for which memory subsystem 144A is the home subsystem. In general, a directory may include entries for coherency units for which the memory subsystem is a home subsystem. It is noted that while an embodiment may not utilize a protocol with the "O" state, the description herein may still refer to a subsystem as owning a particular coherency unit if it maintains an exclusive or modified copy.

As used herein, a "coherency unit" is a number of contiguous bytes of memory that are treated as a unit for coherency purposes. For example, if one byte within the coherency unit is updated, the entire coherency unit is considered to be updated. In some embodiments, the coherency unit may be a cache line or a cache block. Thus, in one embodiment, directory 220A maintains an entry 620 for one or more cache lines whose home is memory subsystem 144A. In addition, directory 220A may include an entry for one or more clients 604-612 within computer system 140 that may have a copy of the corresponding cache line. Each entry in directory 220A indicates the coherency state of the corresponding cache line in clients of the computer system. In one embodiment, an address space of the system may be allocated among memory subsystems 144 in a cache line interleaved manner. In such an embodiment, a given memory subsystem 144 is not allocated blocks of contiguous cache lines. Rather, in a system which includes N memory subsystems, each memory subsystems may be allocated every Nth cache line of the address space. Other methods of allocating storage among memory subsystems are possible and are contemplated.

It is noted that numerous alternative directory formats to support directory based coherency protocols may be implemented. For example, while the above description includes an entry 604-612 for each client within a computer system, an alternative embodiment may only include entries for groups of clients. For example, clients within a computer system may be grouped together or categorized according to various criteria. For example, certain clients may be grouped into one category for a particular purpose while others are grouped into another category. In such an embodiment, rather than including an indication for every client in a group, a directory within a memory subsystem 144 may include an indication as to whether any of the clients in a group have a copy of a particular coherency unit. If a request is received for a coherency unit at a memory subsystem 144 and the directory indicates that a group "B" may have a copy of the coherency unit, a corresponding coherency transaction may be conveyed to all clients within group "B." By maintaining entries corresponding to groups of clients, directories 220 may be made smaller than if an entry were maintained for every client in a computer system.

Other directory formats may vary the information stored in a particular entry depending on the current number of sharers. For example, in some embodiments, a directory entry may include a pointer to a client device if there is a single sharer. If there are multiple sharers, the directory entry may be modified to include a bit mask indicating which clients are sharers. Thus, in one embodiment, a given directory entry may store either a bit mask or a pointer depending on the number of sharers.

By maintaining a directory as described above, appropriate coherency actions may be performed by a particular memory subsystem (e.g., invalidating shared copies, requesting transfer of modified copies, etc.) according to the information maintained by the directory. A controller 210 within a subsystem 144 is generally configured to perform actions necessary for maintaining coherency within a computer system according to a specific directory based coherence protocol. For example, upon receiving a request for a particular coherency unit at a memory subsystem 144, a controller 210 may determine from directory 220 that a particular client may have a copy of the requested data. The controller 210 may then convey a message to that particular client which indicates the coherency unit has been requested. The client may then respond with data (e.g., if the coherency unit is modified) or with an acknowledgment or any other message that is appropriate to the implemented coherency protocol. In general, memory subsystems 144 maintain a directory and controller suitable for implementing a directory based coherency protocol. As used herein, a directory based cache coherence protocol is any coherence protocol that maintains a directory containing information regarding cached copies of data, and in which coherence commands for servicing a particular coherence request are dependent upon the information contained in the directory.

In one embodiment, transactions may be initiated upon address/data network 150 by sending encoded packets that include a specified address. Data packets conveyed on address/data network 150 may be associated with corresponding address transactions using transaction IDs, as discussed below. FIG. 4 is a chart illustrating various packet types, including a description of each, that may be supported by one embodiment of computer system 140. It is to be understood that different and/or additional packet types and/or coherence requests may be supported. As illustrated, coherence requests that may be supported include read-to-share (RTS), read-to-own (RTO), read-stream (RS), writestream (WS), copyback invalidate (CPI), invalidate (INV), pull data (PULL), acknowledge (ACK), acknowledge with no data returned (ACKN), and a data packet (DATA).

Generally speaking, a read-to-share request may be used by a client to request read-only copies of coherency units. Similarly, read-to-own requests may be initiated by clients to request writeable copies of coherency units. A read-stream request initiates a transaction to provide a requesting device with a read-once copy of a coherency unit. A writestream request initiates a transaction to allow a requesting device to write an entire coherency unit and send the coherency unit to memory. In addition, the write data in a writestream transaction is not allocated in the requester's cache. The copyback invalidate request is used to retrieve data from a processor and invalidate the retrieved data in the processor. The invalidate request is used to invalidate a coherency unit in a processor. The pull request may be used to retrieve data from a client device. The acknowledge packet type is used for acknowledging various requests. The acknowledge—no data is used to acknowledge a request for data, but indicates no data will be provided. Finally, the data packet is used to convey data. As already noted, other and/or different packet types may be utilized in addition to those described above. Further, subsets of the above packet types may be used as well. For example, different types of DATA packets may be used for conveying cacheable data, non-cacheable data, read stream data, and so on. Each such data packet may also have an identifier to indicate its type. Similarly, different types of acknowledgments or pull requests may be utilized. Numerous such alternatives are possible and are contemplated.

In one embodiment, when an initiator initiates a transaction, the address packet for that transaction may include a transaction identifier. In one embodiment, the transaction identifier may be formed by an identification of the initiating device and a packet identifier assigned by the initiator. Packets that the initiator receives may be routed to the initiator through data network 152 by placing the initiator's device identifier in the packets' routing prefixes. In addition, the DATA, ACK and/or PULL packets may contain a destination packet identifier field which matches the packet identifier which was assigned by the initiator, allowing the initiator to match the received DATA, ACK, and/or PULL packet with the correct transaction. Furthermore, PULL packets may include a pull identifier which consists of the source's device identifier and a packet identifier assigned by the source (that is, the client which sent the PULL packet). The initiator may send a DATA or ACKN packet to the source of the PULL. This DATA or ACKN packet may be routed by placing the device identifier of the source of the PULL in the packet's routing prefix. The DATA or ACKN packet may contain a destination packet identifier field that allows it to be matched with the correct PULL (in addition, the packet may include a flag which indicates that it was sent in response to a PULL, thus preventing confusion between transaction identifiers and pull identifiers).

In a system such as that described above, one example of a typical transaction may be as follows:

1. Client A (e.g., a CPU) sends a request for data to client B (e.g., a memory controller). The request includes the address of the data and a transaction ID.
2. Client B sends the data to client A together with the transaction ID to identify it. Client B also keeps the address and the transaction ID.
3. Client A uses the data and modifies it.
4. Eventually, client A needs to reuse the resources this data occupies. Since both sides know the address already, client A only sends the data and its transaction ID back to client B.
5. Client B looks up the address linked to the transaction ID. It now has both pieces, data and address, and may store the data.

There are, however, weaknesses associated with the above approach. Transaction IDs are typically short in length and are not well, if at all, protected. Any corruption or misrouting of the transaction ID, or misrouting of data in steps 2-5 above may not be detected, which may lead to "good" data and a "good" address being combined, when in fact they do not belong together. Therefore, in one embodiment, a "replicate and compare" approach is utilized to enhance data reliability. In one embodiment of a replicate and compare approach, a symbol is generated which is utilized to enhance data reliability. In such an embodiment, the symbol is generated based upon one or more parts of a transaction which may be separated by time and/or space. The part(s) upon which the symbol is based may generally comprise some distinguishing identifier associated with the transaction. For example, in many systems, address and data portions of a particular transaction may be conveyed via separate paths. In addition, data which is returned responsive to a request may be returned out of order with respect to the order in which the request was initiated. The symbol which is generated may then accompany or otherwise be associated with a portion of the transaction (e.g., the data portion). When portions of a transaction which have been separated come together again to perform some type of operation, the symbol may be used to ensure that the various portions do in fact correspond to one another. In this manner, mismatching of portions of a transaction, or other types of data corruption, may be detected.

In one embodiment, if an operation (e.g., a store operation) is to be performed with one part (e.g., the data) of a transaction, a check may be performed against the second part of the transaction that will be used in the operation (e.g., the address for the store operation). Using a previously generated symbol which was based at least in part upon the address, some representation of the second part (i.e., the address) may exist and may be associated with the first part which may then be compared to the second part. If the check fails, then an error may be detected. For example, an error may be detected which indicates the address which is to be used for the store operation is not the correct address. It is noted that the address itself may in fact be "correct" for some other transaction and not be corrupted in any way, but may simply be the incorrect address for this particular operation. In addition, in one embodiment, a suitable error detection encoding may be applied to the symbol to compress the information so that the cost of carrying it is relatively low on any of the multiple paths. Optionally, this compressed information may be further optimized, by embedding it into any pre-existing individual error detection or correction code for each path.

In one embodiment, the address component of memory data is selected for the distinguishing identifier. For an address path, this distinguishing identifier is already carried, so nothing new needs to be added. For a data value path, a symbol comprising some representation of the distinguishing identifier (e.g., a single parity bit of the address) may be carried as the replicated information. In addition, this data path may be protected by an error correcting code. In some cases, this error correcting code may have the ability to encode an additional data bit (such as the address parity bit) without the need to increase the number of check bits. Consequently, the data value path may effectively carry some representation of the distinguishing identifier, without the need for any extra bits. Error detection may then include a comparison of the distinguishing identifier wherever the multiple paths of a memory transaction converge—typically when memory data is stored in, or retrieved from, an array or is being consumed. In this manner, the relationship between address and data may be maintained and checked throughout the life of a transaction, even when the address and data are separated by space and/or time.

Using a replicate and compare approach as described above, various scenarios in a computing system may be as described below. As described above, transaction address and data information may be conveyed via different paths, though embodiments wherein a common path are used are possible as well. It is noted that the following scenarios are not intended to be limiting. Rather, the following scenarios are merely intended to be exemplary.

Scenario A
1. Client A (e.g., a CPU) sends a request for data to client B (e.g., a memory controller). The request includes the address of the data and a transaction ID.
2. Client B generates a symbol based on the address. It attaches the symbol to the data, for example by modifying the data's protection field (e.g., ECC bits). Since client A and client B both know the address, both sides can "undo" the modification. Client B sends the data (including the embedded symbol) to client A together with the transaction ID. In one embodiment, client B also keeps the address and possibly the transaction ID.
3. Client A receives and stores the data and symbol in a local cache. Client A may also modify the data. Client A can check the validity of the association between the data and address at anytime by checking the symbol.
4. Client A may then need to reuse the resources (e.g., the cache location) this data occupies. Since both client A and client B know the address already, client A only sends the data (including the embedded symbol) and its transaction ID back to client B.
5. Client B retrieves the address which is mapped to the transaction ID. In addition, it checks the received symbol to verify the association between the retrieved address and data. If the symbol verification shows no error, the data may be stored using the retrieved address. If the symbol verification shows an error, a suitable error message or signal may be generated.

Scenario B
1. Client A (e.g., a CPU) initiates a transaction configured to store data in a particular location within a local cache which is currently occupied by other unrelated data (e.g., due to a cache conflict miss).
2. Client A then proceeds to initiate a writeback of the data in the particular location. Client A generates a symbol corresponding to the writeback transaction which is based at least in part on the writeback data address. Client A subsequently sends the data and generated symbol to client B (e.g., a memory controller).
3. Client B may then use the received symbol to determine whether the address which corresponds to the writeback data is correct.
4. If no error is detected, the writeback may be completed. Otherwise, an error may be indicated.

Scenario C
1. Client A (e.g., a CPU) sends a request for data to client B (e.g., a memory controller). The request includes the address of the data and a transaction ID. In one embodiment, the transaction ID is not a separate entity. Rather, some portion of the address (e.g., a cache index portion of the address) may itself serve as a transaction ID. In other embodiment, an entirely different transaction ID may be utilized. In such a case the transaction ID is implicit in the address.
2. Client B generates a symbol based on the address and returns the data to client A along with the generated symbol. Client B may store the address of the transaction in a local storage location indexed by the possibly "implicit" transaction ID.
3. Client A receives both the data and symbol and may check the validity of the association between the data and address at anytime by using the received symbol.
4. Client A may then need to reuse the resources (e.g., the cache location) this data occupies. Since both client A and client B know the address already, client A only sends the data (including the embedded or associated symbol) and its (implicit) transaction ID back to client B.
5. Client B retrieves the address which is mapped to the transaction ID (e.g., index). In addition, it checks the received symbol to verify the association between the retrieved address and data. If the symbol verification shows no error, the data may be stored using the retrieved address. If the symbol verification shows an error, a suitable error message or signal may be generated.

Figure 5:
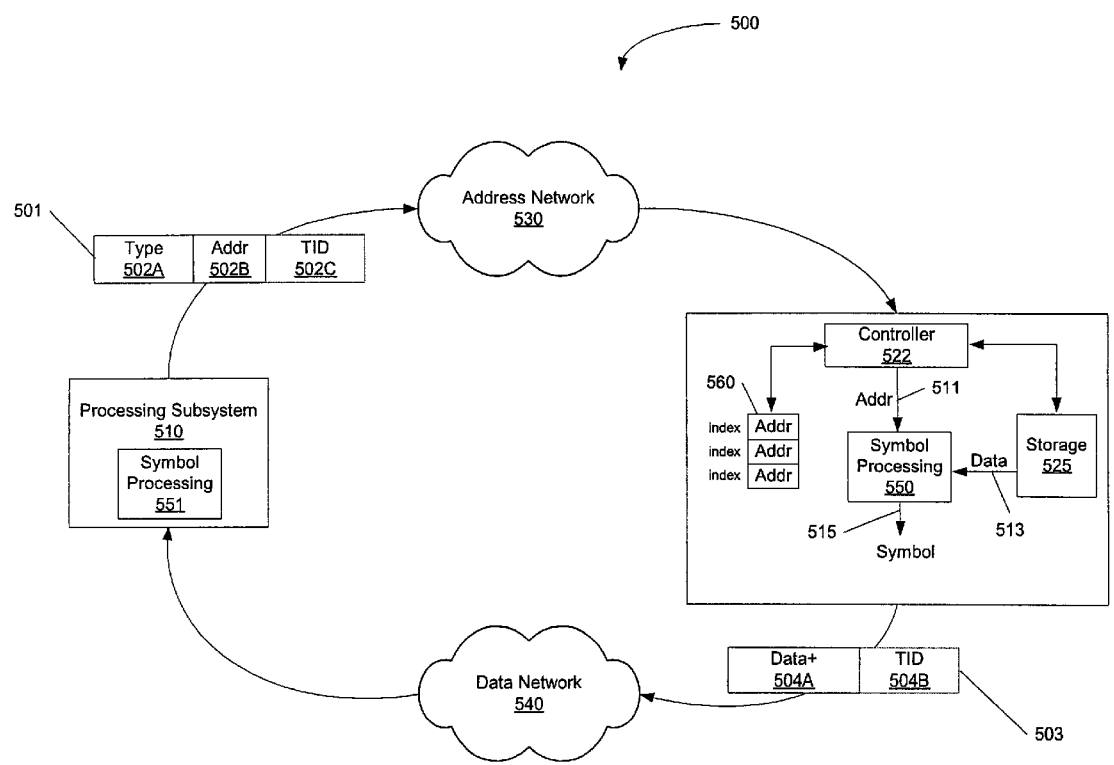
FIG. 5 illustrates one embodiment of a data read transaction scenario.

Turning now to FIG. 5, one embodiment of a system 500 depicting a transaction using a replicate and compare approach is shown. In the example shown, a processing subsystem 510 and memory subsystem 520 are shown coupled to both an address network 530 and data network 540. Memory subsystem 520 is shown to include a controller 522 configured to process transactions received from, or conveyed to, either the address 530 or data 540 networks. Memory subsystem 520 further includes storage 525 (e.g., DRAM, SRAM, or any other suitable type of storage technology), and storage 560 which is configured to store transaction related addresses (Addr). In one embodiment, the index portion of a transaction address may serve as a transaction ID which may be used to identify the storage location of a particular transaction address within storage 560. Other embodiments could utilize a separately generated and stored transaction ID if desired. Memory subsystem 520 further includes a symbol processing unit 550 configured to perform operations related to the above described distinguishing identifier. It is to be understood that depiction of the various components in memory subsystem 520 is provided for purposes of discussion. Memory subsystem 520 may include other components. In addition, the functionality provided by the depicted components may be performed by different components and memory subsystem 520 may be configured differently.

In FIG. 5, processing subsystem 510 is shown to include a symbol processing unit 551. Symbol processing unit 551 may generally provide similar functionality to that of symbol processing unit 550. In the example shown, processing subsystem 510 initiates a request retrieve data. The processing of the request causes a transaction packet 501 to be conveyed via address network 530 to memory subsystem 520. The packet 501 includes information indication the type 502A of request, the address 502B of the requested data, and a transaction ID 502C. In one embodiment, the transaction ID 502C (which may be implicit in the address 502B rather than a separate entity) may be formed by the initiator's 510 device ID and a packet ID assigned by the initiator 510. However, other methods of generating a transaction ID are possible and are contemplated. In response to receiving the packet 501, the controller 522 may retrieve the requested data 513 from storage 525. In addition, an entry may be stored in table 560 to include the transaction ID (TID) 502C and address 502B extracted from the received packet. Processing subsystem 510 may also have a TID 502C to address 502B mapping stored within subsystem 510.

In one embodiment, memory subsystem 520 does not return the address 502B with the requested data 513 to the processing subsystem. Rather, the transaction ID 502C is used for purposes of identifying the address which corresponds to the data. Consequently, the data is separated from its corresponding address by both space and time. In order to provide enhanced data protection, memory subsystem 520 utilizes symbol processing unit 550 to generate a "symbol" derived from the corresponding address which accompanies the returned data. In this manner, some representation of the address accompanies the data. When an operation is to be performed with the data that requires using its corresponding address, an address which is to be used with the data is first compared to the symbol associated with the data in order to verify that the proposed address is in fact the correct address. If the address verification fails, then either address/data corruption is indicated, or the data and proposed address do not correspond to one another.

In the example shown, symbol processing unit 550 receives the address 502B extracted from the packet 501 and the retrieved data 513. Processing unit 550 then generates a symbol (e.g., one or more particular bits of data) which are associated with the data 513. In one embodiment, a single parity bit of the address may be added to the data returned with the data. For example, the address parity bit could be added to ECC bits generated for the data 513 (e.g., by symbol processing unit 550 or some other unit). Alternatively, the additional parity bit (and/or bits of the corresponding address) may be used to generate ECC bits which accompany the data. Depending upon the particular encoding, the resulting ECC may not include any more bits than the ECC for the data itself. Numerous ways of generating an appropriate symbol from the address are possible and are contemplated. Though, generally speaking, the generated symbol will include fewer bits of data than the address itself.

Subsequent to generating the address derived symbol 515, a return data packet 503 is generated and conveyed via data network 540 to the processing subsystem 510. The data packet 503 may generally include at least the transaction ID 504B (which may be implicit as described above), and the requested data including the generated symbol 504A (represented as Data+). Data+ 504A may include, for example, the requested data 513 and ECC bits. The ECC bits may be generated based upon the returned data and the symbol. In response to receiving the data packet 503, processing subsystem 510 may use the transaction ID 504B included therein to retrieve a corresponding address (e.g., from a local table similar to that of table 560). Processing subsystem 510 may then utilize the retrieved address and the symbol included in the packet 503 to confirm the retrieved address and data correspond to one another. Accordingly, even though the data and corresponding address have been separated from one another, a method and mechanism for verifying the association of an address and data is provided. Other processing such as performing an ECC check on the received data may be performed as well. If no errors are detected, the received data may be utilized (e.g., stored in a local cache). If an error is detected, a suitable error detection indication may be generated. Such an error indication may include notifying the memory subsystem 510 of the error and requesting a resend of the data, or any other error handling mechanism deemed suitable.

Figure 6:
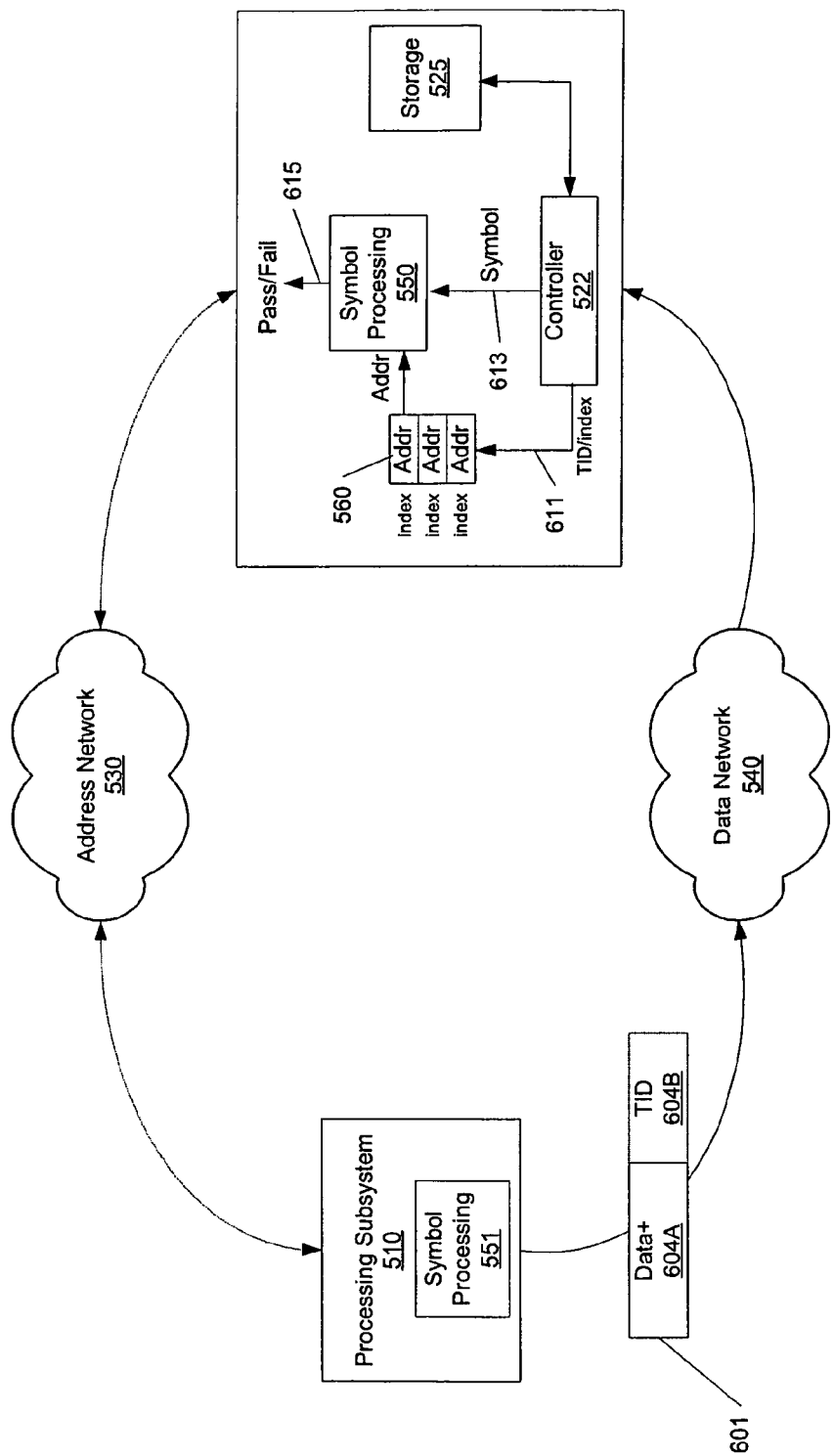
FIG. 6 illustrates one embodiment of a data writeback scenario.

FIG. 6 depicts one embodiment of a system in which a processing subsystem returns (e.g., writes back) data to a memory subsystem. For ease of discussion, the system of FIG. 5 is used with similar components similarly numbered. In the example shown, assume a continuation of the discussion of FIG. 5 wherein processing subsystem 510 requested and received data from memory subsystem 520. While the data is resident in processing subsystem 510, the originally created transaction ID and address mapping are maintained in both the processing subsystem 510 and memory subsystem 520.

At some point in time, processing subsystem 510 initiates a writeback of the data (which has typically been modified) to memory subsystem 520. Prior to returning the data, symbol processing unit 551 retrieves the corresponding address (e.g., from a local storage device). The retrieved address is then used to generate a symbol which will accompany the returned data. A packet 601 is then generated and conveyed via the data network 540 to the memory subsystem 520. The packet 601 includes at least the data and the symbol, and may include a transaction ID 604B which could be implicit as discussed above. The data and symbol are represented by Data+ 604A. Controller 522 then receives the data packet 601, extracts the transaction ID 611 which is then used to retrieve a previously stored address 617 from table 560. Symbol processing unit 550 may then process the symbol 613 and address 617 to verify they match. Based upon such verification, a pass or fail 615 is indicated.

Figure 7:
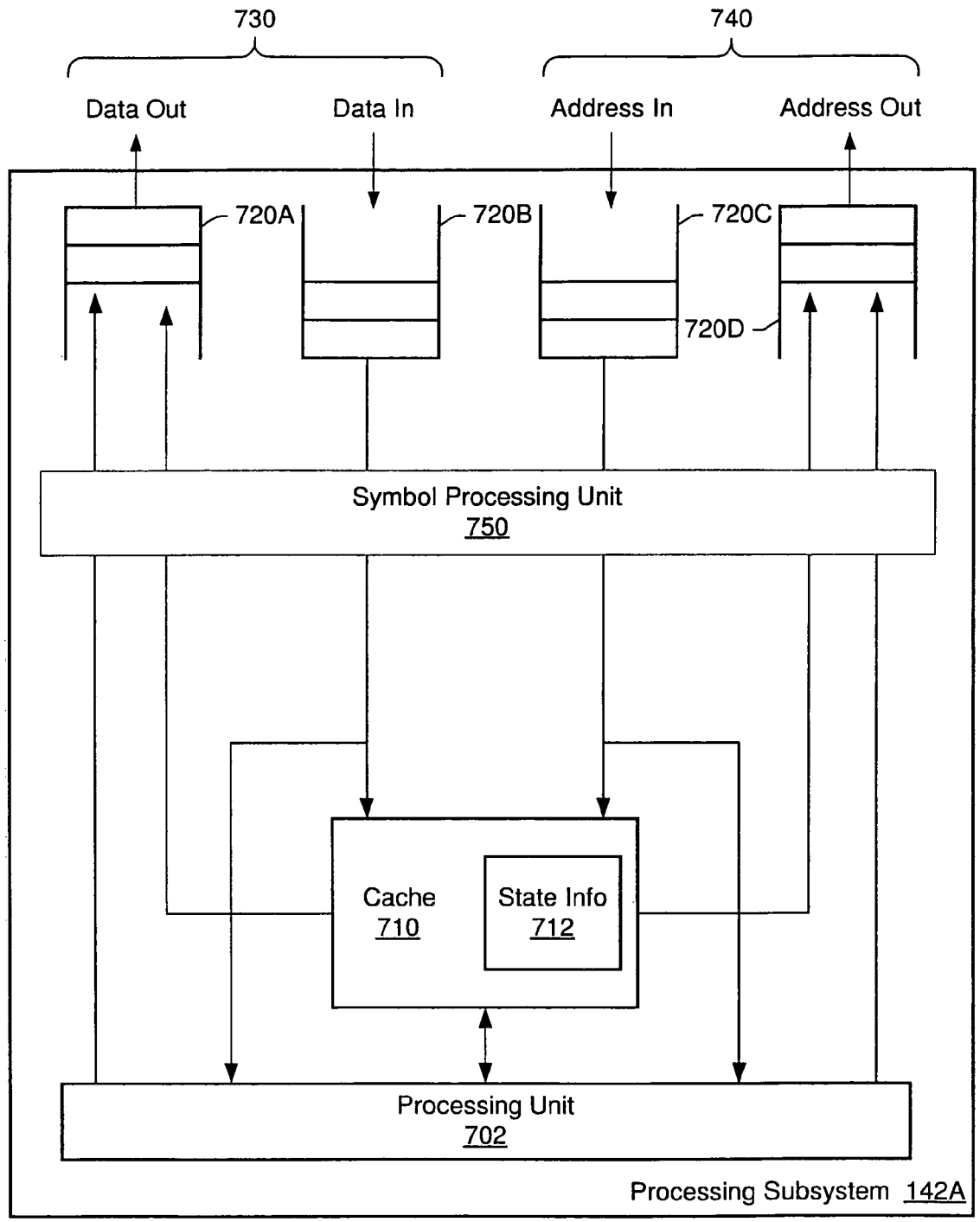
FIG. 7 is a block diagram of a client device in the system of FIG. 1.

FIG. 7 is a block diagram illustrating one embodiment of a processing subsystem 142A within a node 140. Included in the embodiment of FIG. 7 are a processing unit 702, cache 710, symbol processing unit 750, and queues 720. Queues 720A-720B are coupled to data network 152 via data links 730, and queues 720C-720D are coupled to address network 150 via address links 740. Processing unit 702 is coupled to cache 710. Symbol processing unit 750 may generally include circuitry which performs the above described processing responsive to receiving address and/or data packets. Symbol processing unit 750 may or may not itself include a mapping to transaction IDs to addresses as discussed. It is noted that while symbol processing unit 750 is shown as a separate unit between the node interface and other components of the node, the circuitry of the symbol processing unit 750 may be included in other components of the node (e.g., a cache or memory controller). Numerous such alternatives are possible and are contemplated.

In one embodiment, processing unit 702 is configured to execute instructions and perform operations on data stored in memory subsystems 144. Cache 710 may be configured to store copies of instructions and/or data retrieved from memory subsystems 144. In addition to storing copies of data and/or instructions, cache 710 also includes state information 712 indicating the coherency state of a particular memory block within cache 710. If processing unit 702 attempts to read or write to a particular memory block, and cache state info 712 indicates processing unit 702 does not have adequate access rights to perform the desired operation (e.g., the memory block is invalid in the cache 710), an address transaction comprising a coherency request may be inserted in address out queue 720D for conveyance to a home subsystem of the memory block. These coherency requests may be in the form of read-to-share and read-to-own requests. Such requests may further include a transaction ID as discussed above. Subsequently, a valid copy of the corresponding memory block, and a symbol generated by the conveying memory subsystem, may be received via data in queue 720B.

In addition, processing subsystem 142A may receive coherency demands via address in queue 720C, such as a read-to-own or invalidate demand. If processing subsystem 142A receives a transaction corresponding to a read-to-own request for a memory block which is modified in cache 710, the corresponding memory block and previously stored transaction ID may be returned via data out queue 720A, and its state information 712 for that block may be changed to invalid. Alternatively, if processing subsystem 142A receives an invalidate demand for a memory block whose state is shared within cache 710, state information 712 may be changed to indicate the memory block is no longer valid within cache 710 and a corresponding mapping of address to transaction ID may be removed from a local table. Those skilled in the art will recognize there are numerous possible arrangements for caches 710, processing units 702, and interfaces 720.

Figure 8:
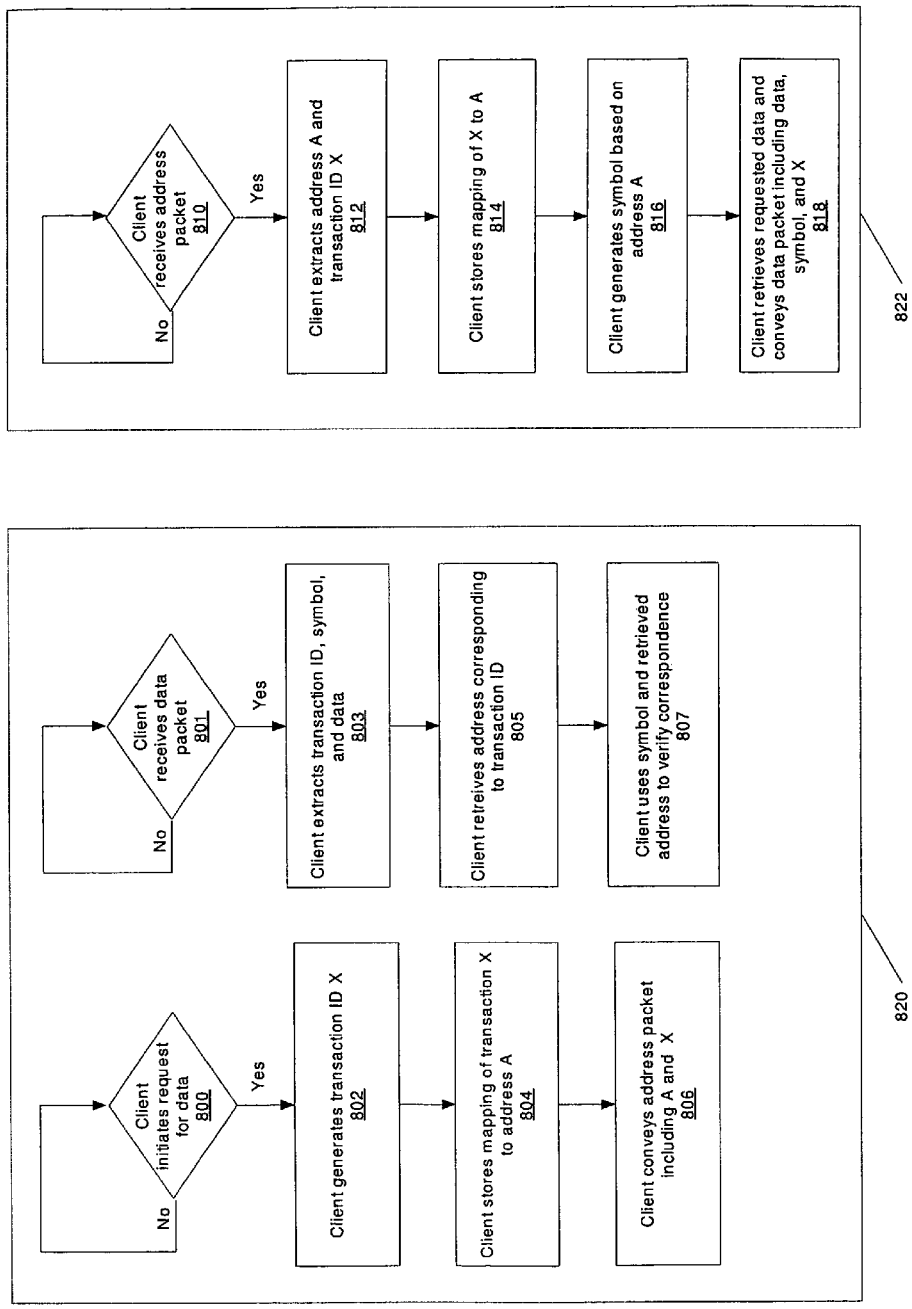
FIG. 8 shows one embodiment of a method for processing transactions.

FIG. 8 illustrates one embodiment of a method for utilizing an address to data association symbol as described above. For purposes of discussion, elements depicted within block 820 generally correspond to activities within a requesting client (e.g., a processing subsystem) and elements depicted within block 822 may correspond to activities occurring within a memory subsystem. In the example shown, if a client initiates a request for data (decision block 800), the client generates a transaction ID "X" (block 802), stores a mapping of the corresponding data address A to the transaction ID X (block 804), and conveys an address packet including the address A and the transaction ID X.

If a client receives an address packet (decision block 810), the receiving client extracts the address A and transaction ID X (block 812), stores a mapping of the address A to the transaction ID X (block 814), generates a symbol based at least in part on the address A (block 816), and finally retrieves the requested data and conveys a data packet including the data, symbol, and transaction ID X (block 818).

If a client receives a data packet (decision block 801), the client extracts the included transaction ID, symbol, and data (block 803). The client then retrieves an address which corresponds to the extracted symbol (e.g., from a local table) (block 805), and uses the extracted symbol to verify the retrieved address (block 807).

Figure 9:
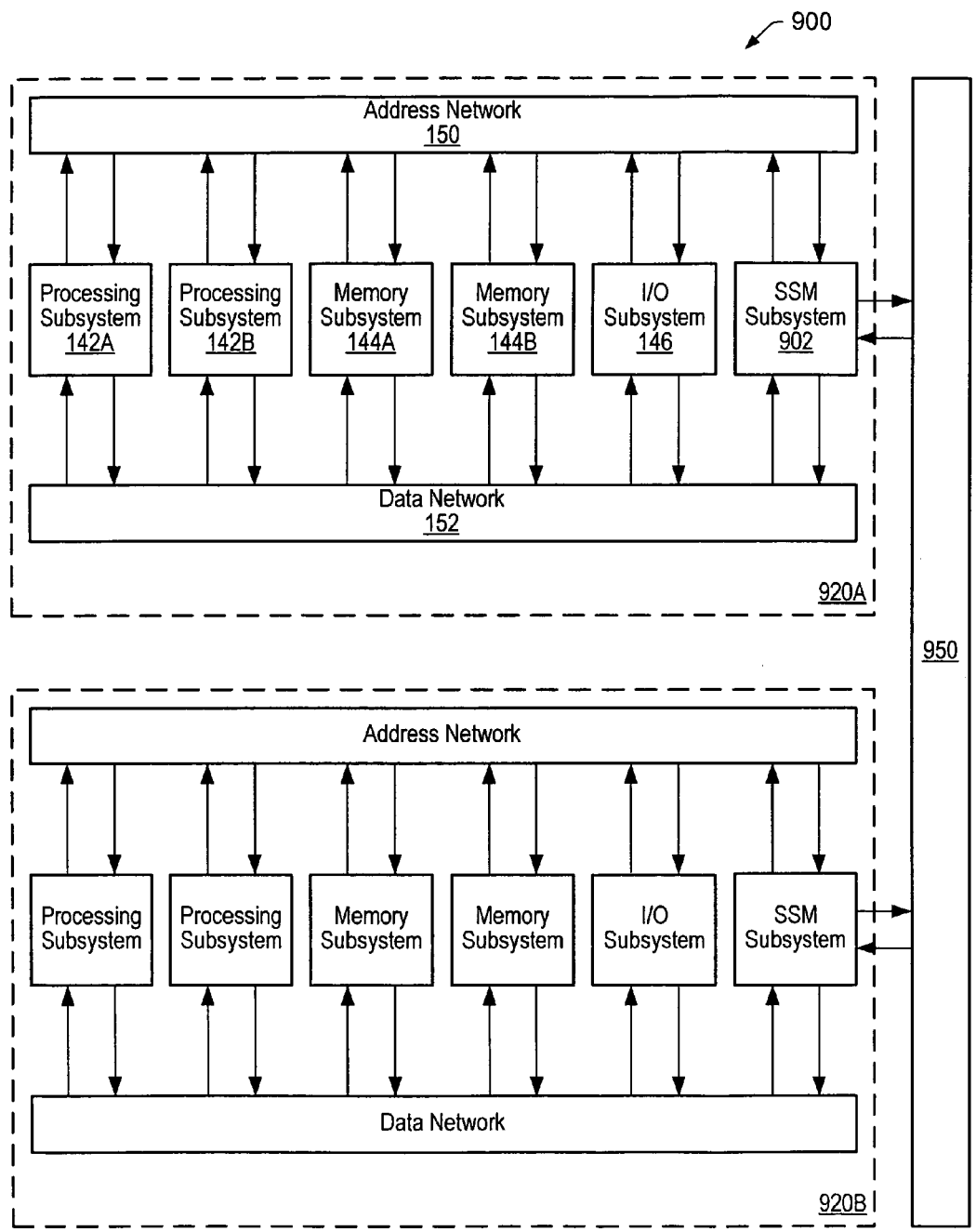
FIG. 9 is a block diagram of a multi-node computer system including the node of FIG. 1.

Turning now to FIG. 9, one embodiment of a multi-node computer system 900. Computer system 900 includes nodes 920A and 920B. Each of nodes 920 may be similar to the node of FIG. 1. In addition to processing subsystems 142, memory subsystems 144, and I/O subsystem 146, each node 920 includes an scalable shared memory (SSM) subsystem 902. SSM subsystem 902 is coupled to address network 150 and data network 152. Further, SSM subsystems 902 are coupled to a global interconnect 950. In a multi-node computer system 900 as shown in FIG. 9, global interconnect 950 serves as a communication medium between nodes 920. Consequently, data may not only be shared within a particular node 920A, but may also be shared between nodes 920 within a system 900. Generally, SSM subsystem 902 is configured to provide a communication interface between a node 920A and global interconnect 950.

In addition to the above, it is noted that one or more of the functions described may be performed by a processing unit, whether general purpose or special purpose, executing instructions stored on a computer readable medium. Numerous variations and modifications will become apparent to those skilled in the art once the above disclosure is fully appreciated. For example, the above described methods and mechanisms may be applied within computing systems or otherwise. Further, systems may comprise separate address and data buses and may utilize split-transactions. Other embodiments may utilize a common address/data bus and may not utilize split-transactions. All such alternative embodiments are contemplated. It is intended that the following claims be interpreted to embrace all such variations and modifications.

What is claimed is:

1. A computing system comprising:
one or more clients; and
a network interconnecting the one or more clients;
wherein a first client of said one or more clients is configured to convey data and a generated symbol via the network to a second client of the one or more clients, wherein the data corresponds to an address and the symbol is generated at least in part based upon the address; and
wherein the second client is configured to receive the data and the symbol; and
wherein subsequent to receiving said data and symbol from the first client, the second client is configured to:
retrieve a previously stored address; and
use the received symbol to verify the retrieved address corresponds to the received data.

2. The computing system as recited in claim 1, wherein the address to be used in association with said data is conveyed from the first client to the second client.

3. The computing system as recited in claim 1, wherein the symbol comprises a parity bit of the address.

4. The computing system as recited in claim 1, wherein a representation of the symbol is embedded within an error correcting code which corresponds to the data.

5. The computing system as recited in claim 1, wherein the network comprises a separate address network and data network, wherein the address network is configured to convey address packets, and the data network is configured to convey data packets and the symbol.

6. The computing system as recited in claim 1, wherein the first client comprises a processing subsystem and the second client comprises a memory controller.

7. The computing system as recited in claim 6, wherein the data is stored in a location of a local cache of the first client, and conveying the data and symbol from the first client to the second client is performed responsive to a write back operation, and wherein the first client is configured to generate the symbol when the write back operation is performed.

8. The computing system as recited in claim 6, wherein the data and symbol are stored in a location of a local cache of the first client.

9. The computing system as recited in claim 8, wherein conveying the data and symbol from the first client is performed responsive to a write back operation or a copy back operation.

10. The computing system as recited in claim 8, wherein data stored in the local cache of the first client corresponds to transaction data which was previously received by the first client from the second client.

11. A node for use in a computing system, the node comprising:
a network interface, the network interface comprising a separate address network and data network; and
a symbol processing unit;

wherein subsequent to receiving data and a symbol, the symbol having been generated based at least in part on an address which corresponds to the data, the node is configured to:
- retrieve a previously stored address; and
- use the received symbol to verify the retrieved address corresponds to the received data.

12. The node as recited in claim 11, wherein the symbol comprises a parity bit of the address.

13. The node as recited in claim 11, wherein a representation of the symbol is embedded within an error correcting code which corresponds to the data.

14. The node as recited in claim 11, wherein the network comprises a separate address network and data network, wherein the address network is configured to convey address packets, and the data network is configured to convey data packets and the first symbol.

15. The node as recited in claim 11, wherein the data and first symbol are stored in a location of a local cache of the node.

16. The node as recited in claim 15, wherein the data and first symbol are conveyed by the node responsive to a write back operation or a copy back operation.

17. A method comprising:
- generating a symbol based at least in part on an address;
- conveying data and the symbol via a data network, wherein the data corresponds to the address;
- receiving the data and the symbol; and
- utilizing the symbol to determine whether the data and an address to be used in association with the data correspond to one another;
- wherein subsequent to receiving said data and symbol from the first client, the method further comprises the second client:
  - retrieving a previously stored address which corresponds to said transaction; and
  - using the received symbol to verify the retrieved address corresponds to the received data.

18. The method as recited in claim 17, wherein the data and symbol are stored in a location of a local cache of a first client.

19. The method as recited in claim 18, wherein conveying the data and symbol is performed responsive to a write back operation or a copy back operation.

20. The method as recited in claim 18, wherein data stored in the local cache of the first client corresponds to transaction data which was previously received by the first client from the second client.

* * * * *